United States Patent
Agner et al.

(10) Patent No.: US 9,453,540 B2
(45) Date of Patent: Sep. 27, 2016

(54) DOUBLE CLUTCH SYSTEM

(75) Inventors: Ivo Agner, Bühl (DE); Oliver Nöhl, Bühlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1810 days.

(21) Appl. No.: 12/322,613

(22) Filed: Feb. 4, 2009

(65) Prior Publication Data

US 2009/0205924 A1    Aug. 20, 2009

(30) Foreign Application Priority Data

Feb. 4, 2008    (DE) .................. 10 2008 007 268

(51) Int. Cl.
| | |
|---|---|
| *F16D 13/72* | (2006.01) |
| *F16D 21/06* | (2006.01) |
| *F16D 25/12* | (2006.01) |

(52) U.S. Cl.
CPC ............. *F16D 25/123* (2013.01); *F16D 13/72* (2013.01); *F16D 21/06* (2013.01); *F16D 2021/0676* (2013.01); *F16D 2300/26* (2013.01); *Y02T 10/76* (2013.01)

(58) Field of Classification Search
CPC .............................................. F16D 2021/0676
USPC .............. 192/48.618, 48.619, 85.35, 48.603, 192/48.8–48.91, 85.61, 70.12, 113.34, 112
See application file for complete search history.

(56) References Cited

U.S. PATENT DOCUMENTS

| | | | | |
|---|---|---|---|---|
| 3,249,189 | A * | 5/1966 | Schjolin et al. ........... | 192/70.12 |
| 5,172,799 | A * | 12/1992 | Iijima et al. .............. | 192/106 F |
| 5,647,467 | A * | 7/1997 | Yamauchi ................ | 192/48.619 |
| 5,946,971 | A * | 9/1999 | Toyota et al. ................... | 74/331 |
| 6,464,059 | B1 * | 10/2002 | Kundermann et al. .. | 192/48.618 |
| 7,874,415 | B2 * | 1/2011 | Agner et al. ................. | 192/48.8 |
| 7,966,901 | B2 * | 6/2011 | Metzinger et al. ............ | 74/331 |
| 8,376,108 | B2 * | 2/2013 | Fujita ........................... | 192/48.8 |
| 2004/0144607 | A1 * | 7/2004 | Back et al. .................... | 192/3.3 |
| 2005/0067251 | A1 * | 3/2005 | Braford et al. ............ | 192/70.12 |
| 2005/0279603 | A1 * | 12/2005 | Agner .......................... | 192/48.8 |
| 2007/0193843 | A1 * | 8/2007 | Uhler et al. ................. | 192/48.8 |
| 2007/0221468 | A1 * | 9/2007 | George et al. ............. | 192/87.11 |
| 2007/0227852 | A1 * | 10/2007 | Uhler ........................... | 192/48.8 |

* cited by examiner

*Primary Examiner* — Robert Hodge
*Assistant Examiner* — Terry Chau
(74) *Attorney, Agent, or Firm* — Alfred J. Mangels

(57) ABSTRACT

A double clutch system for a drive train that includes a drive unit and a double clutch transmission. The double clutch system includes two wet-running, multi-plate clutches that include inner plate carrier components, each of which is non-rotatably connected to a respective transmission input shaft, and between which cooling oil is supplied to the multi-plate clutches. A pressure chamber is provided for the cooling oil radially inwardly of at least one of the multi-plate clutches and in an axial direction between the inner plate carrier components.

33 Claims, 4 Drawing Sheets

DOUBLE CLUTCH SYSTEM

BACKGROUND OF THE INVENTION

1. Field of the Invention

The present invention relates to a drive train that includes a drive unit, a double clutch, and a transmission. The double clutch includes two wet-running, multi-plate clutches that are cooled by circulated cooling oil. The clutches each include inner, plate carrier components, each of which is non-rotatably connected to a respective transmission input shaft, and through which cooling oil is fed to the multi-plate clutches.

2. Description of the Related Art

The heat arising during slippage between the lamellae and/or friction disks that transmit torque in a multi-plate clutch is dissipated in liquid-cooled friction clutches using a coolant liquid. The coolant liquid, which can be used simultaneously for lubricating bearings of the clutch or even of a transmission, circulates in a coolant loop, within which it flows through a cooler. It is expedient to regulate the quantity of coolant liquid supplied to the clutch and flowing between the friction disks depending on the driving condition. During driving, a minimum volume flow is required to dissipate the heat arising during slip regulation. During clutch engagement a larger volume flow must be provided, because a larger quantity of heat is generated. During synchronization, the volume flow is to be significantly reduced in order to avoid a residual drag torque on the clutch lamellae and/or friction disks and thus on the corresponding synchronization unit.

An object of the present invention is to provide a torque-transmitting device including two wet-running, multi-plate clutches that are cooled by circulated cooling oil, and which is simply constructed and inexpensive to manufacture.

SUMMARY OF THE INVENTION

The above-identified object is achieved with a double clutch system for a drive train that includes a drive unit, a double clutch unit, and a transmission. The double clutch unit includes two wet-running, multi-plate clutches that include inner plate carrier components, each of which is non-rotatably connected to a respective transmission input shaft, and through which cooling oil is fed to the multi-plate clutches. A pressure chamber is provided for the cooling oil radially inward of at least one of the multi-plate clutches and axially between the inner plate carrier components. The terms radial and axial refer to a common axis of rotation of the multi-plate clutches or of the transmission input shafts. Axial means in the direction of or parallel to the axis of rotation. Radial means transverse to the axis of rotation. The bounding of the pressure chamber by the inner plate carrier components provides the advantage that fewer parts are needed to form the pressure chamber than with conventional double clutch systems.

A preferred exemplary embodiment of the double clutch system in accordance with the present invention is characterized in that the inner plate carrier components each include an inner plate carrier that axially bounds the pressure chamber. A radially-extending portion of the pressure chamber is situated axially between the two inner plate carriers.

Another preferred exemplary embodiment of the double clutch system in accordance with the present invention is characterized in that the inner plate carrier components include a transmission-side and an input-side output hub, which are each non-rotatably connected to a respective one of the transmission input shafts and which bound the pressure chamber in the axial direction. A radially-extending portion of the pressure chamber is situated between the two output hubs in the axial direction.

Another preferred exemplary embodiment of the double clutch system in accordance with the present invention is characterized in that the transmission-side output hub is axially supported toward the transmission on one of the transmission input shafts by a retaining ring. During assembly, the retaining ring is first installed on the appropriate transmission input shaft. After that, the transmission-side output hub, preferably together with the pre-assembled double clutch, is pushed onto the transmission input shaft, which is preferably implemented as a hollow shaft.

Another preferred exemplary embodiment of the double clutch system in accordance with the present invention is characterized in that the input-side output hub is axially supported toward the drive unit on the other of the transmission input shafts by a retaining ring. Before the retaining ring is installed, the input-side output hub, preferably together with the pre-assembled double clutch, is installed on the other transmission input shaft, which is preferably implemented as a solid shaft. Finally, the retaining ring is installed on the other transmission input shaft.

Another preferred exemplary embodiment of the double clutch system in accordance with the present invention is characterized in that the input-side inner plate carrier, in particular the interconnected input-side output hub, is axially supported by an outer plate carrier. The outer plate carrier is preferably situated on the input side of the double clutch system. In this exemplary embodiment, the retaining ring for axial support of the input-side output hub can be dispensed with.

Another preferred exemplary embodiment of the double clutch system in accordance with the present invention is characterized in that an axial bearing is situated between the input-side inner plate carrier and the input-side outer plate carrier. The axial bearing can be implemented as a needle bearing, for example, or as a slide bearing.

Another preferred exemplary embodiment of the double clutch system in accordance with the present invention is characterized in that a bearing is supported on an offset of a clutch input part. An offset of the clutch input part that is produced when the outer plate carrier is riveted to the clutch input part is preferably used for centering the bearing.

Another preferred exemplary embodiment of the double clutch system in accordance with the present invention is characterized in that the outer plate carrier is supported on a clutch cover by a bearing, in particular the previously-described bearing. The outer plate carrier is preferably supported on the clutch cover through the biasing of at least one actuating lever spring.

Another preferred exemplary embodiment of the double clutch system in accordance with the present invention is characterized in that one of the transmission input shafts includes at least one cooling oil conduit, which issues into the pressure chamber. The cooling oil conduit, in turn, preferably includes a longitudinally drilled portion and a transversely-drilled portion.

Another preferred exemplary embodiment of the double clutch system in accordance with the present invention is characterized in that at least one cooling oil conduit that issues into the pressure chamber is provided between the transmission input shafts. The cooling oil conduit is preferably implemented as an annular space.

Another preferred exemplary embodiment of the double clutch system in accordance with the present invention is characterized in that at least one cooling oil conduit that issues into the pressure chamber is provided between one of the transmission input shafts and the transmission-side output hub. That cooling oil conduit is preferably implemented as an annular space.

Another preferred exemplary embodiment of the double clutch system in accordance with the present invention is characterized in that the output hubs are implemented as sheet metal hubs. That enables the manufacturing costs to be reduced.

Another preferred exemplary embodiment of the double clutch system in accordance with the present invention is characterized in that the input-side input hub has external teeth, in particular rolled teeth. The external teeth serve to non-rotatably connect the input-side input hub to the output part of a torsional vibration damper.

Another preferred exemplary embodiment of the double clutch system in accordance with the present invention is characterized in that the input-side input hub includes a ring, in particular a hardened ring. The radially outer portion of the ring preferably serves as a track for a radial sealing ring. The ring can be rubber-coated on its contact surface with the input-side output hub.

Another preferred exemplary embodiment of the double clutch system in accordance with the present invention is characterized in that the inner plate carriers are each attached to a respective one of the output hubs. The attachment is preferably made with rivets.

Another preferred exemplary embodiment of the double clutch system in accordance with the present invention is characterized in that the inner plate carriers are each attached to one of the output hubs by drawn rivets. The drawn rivets are preferably pressed out of the corresponding output hub.

Another preferred exemplary embodiment of the double clutch system in accordance with the present invention is characterized in that a sealing element that has a U-bend collar that partially encircles the transmission-side inner plate carrier is fastened to the input-side output hub. The sealing element is preferably made of sheet metal. The collar preferably extends axially toward the transmission.

Another preferred exemplary embodiment of the double clutch system in accordance with the present invention is characterized in that a sealing element is fastened to the transmission-side output hub, which has a U-bend collar that partially encircles the transmission-side inner plate carrier. The sealing element is preferably made of sheet metal. The collar preferably extends axially toward the drive unit.

The above-noted object is also achieved with a double clutch system for a drive train that includes a drive unit and a double clutch transmission, the double clutch system having two wet-running multi-plate clutches. The clutches include inner plate carrier components that are each non-rotatably connected to a transmission input shaft and through which cooling oil is fed to the multi-plate clutches. Particularly in the case of a previously-described double clutch system, a bulkhead element, in particular a bulkhead plate, extends inwardly from the base of a clutch bell housing to above the surface of an oil sump that is situated both in the clutch bell housing and in a transmission case of the double clutch transmission. The unified oil sump of the clutch bell housing and of the transmission case of the double clutch transmission can be larger than the outer diameter of the double clutch, so that the double clutch can rotate within it. That could produce an unacceptably high drag torque on the double clutch. A separate space is provided around the double clutch, at least below in the region of the oil sump, by the bulkhead element in accordance with the present invention. The double clutch itself can keep that space free of oil by its rotational motion, and can also carry away the supplied cooling oil again.

Another preferred exemplary embodiment of the double clutch system in accordance with the present invention is characterized in that removal elements are provided above the oil sump. The removal elements serve to keep free of oil the partitioned space around the double clutch by the bulkhead element, and also to again remove the cooling oil.

Another preferred exemplary embodiment of the double clutch system in accordance with the present invention is characterized in that the bulkhead element is attached to the clutch bell housing together with a clutch cover. That simplifies the production of the double clutch system.

Another preferred exemplary embodiment of the double clutch system in accordance with the present invention is characterized in that the bulkhead element is axially fixed in position between the clutch cover and an offset of the clutch bell housing. By means of the offset, the bulkhead element is axially fixed in position toward the transmission. The bulkhead element is axially fixed in position toward the drive unit by the clutch cover. The clutch cover, in turn, can be axially fixed in position toward the drive unit by a retaining ring carried by the clutch bell housing.

Another preferred exemplary embodiment of the double clutch system in accordance with the present invention is characterized in that the bulkhead element is secured against rotation by a projection that engages the clutch bell housing. The bulkhead element can also be fastened to the clutch cover.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
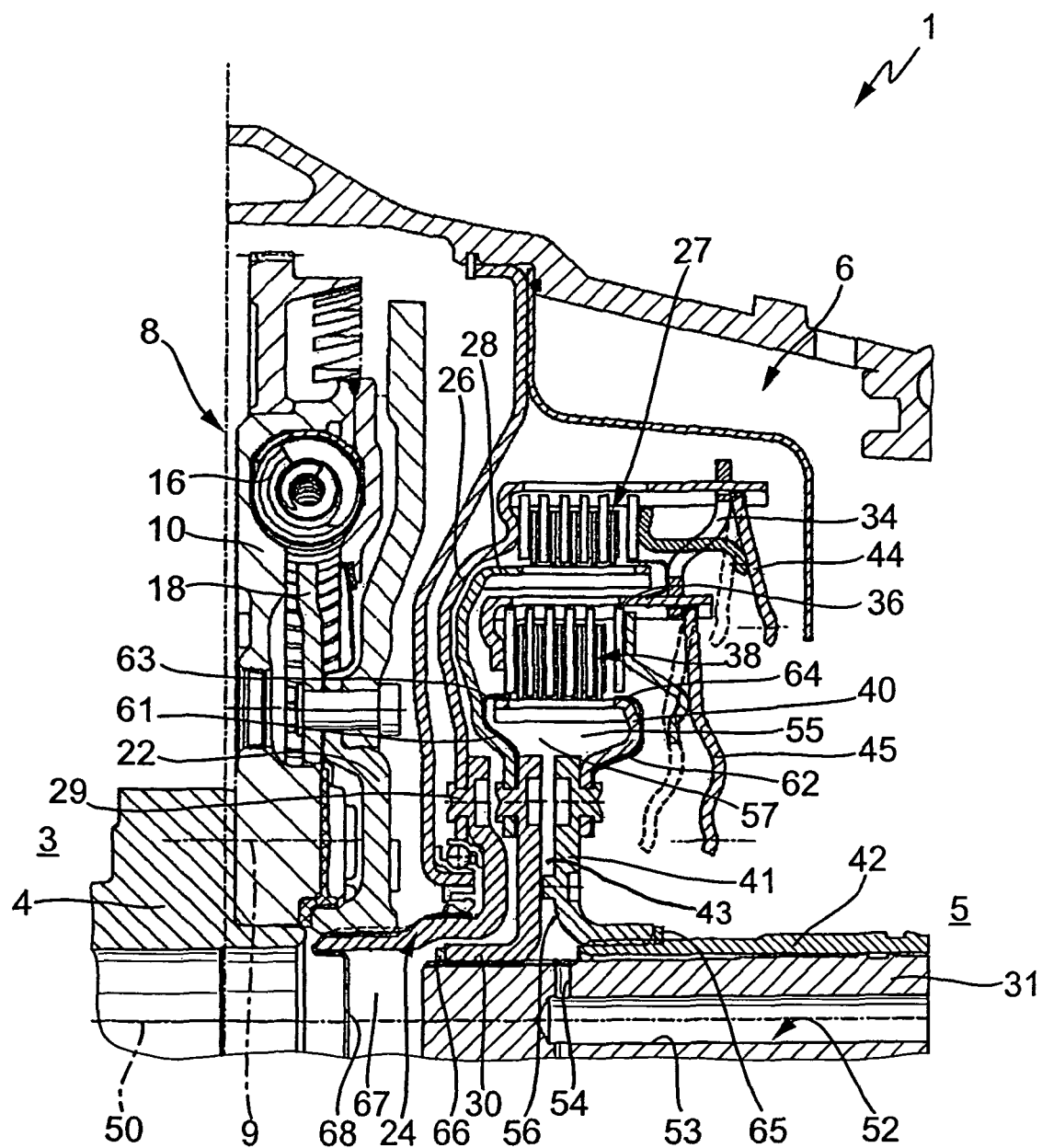
FIG. 1 shows a longitudinal, half-sectional view through part of an embodiment of a drive train of a motor vehicle having a double clutch system in accordance with the present invention.

FIGS. 1 through 4 each show a part of a drive train 1 of a motor vehicle. Between a drive unit 3, in particular an internal combustion engine, from which a crankshaft 4 emerges, and a transmission 5, a wet-running, multi-plate double clutch 6 is positioned. A torsional vibration damper 8 is positioned between drive unit 3 and double clutch 6. Torsional vibration damper 8 is a dual-mass flywheel.

The crankshaft 4 of internal combustion engine 3 is firmly connected to an input part 10 of torsional vibration damper 8 by a threaded connection 9. Input part 10 is coupled through springs 16 to an output part 18 of torsional vibration damper 8 in a known manner. Output part 18 is non-rotatably connected to an input part 24 of double clutch 6 through a connecting part 22.

Clutch input part 24 is implemented as a hub, and is radially outwardly firmly connected to an outer plate carrier 26 of a first multi-plate clutch system 27 by drawn rivets. Situated radially inside outer plate carrier 26 is an inner plate carrier 28 of first multi-plate clutch system 27. Inner plate carrier 28 is attached to an input-side output hub 30 by drawn rivets 29. The drawn rivets 29 are pressed from output hub 30, which is implemented as a sheet metal part. Output hub 30 is non-rotatably connected through inner teeth to a first transmission input shaft 31. The first transmission input shaft 31 is implemented as a solid shaft.

Clutch input part 24, or the outer plate carrier 26 of first multi-plate clutch system 27 attached thereto, is non-rotatably connected through a connecting element 34 to an outer plate carrier 36 of a second multi-plate clutch system 38. Situated radially inside of outer plate carrier 36 is an inner plate carrier 40 of second multi-plate clutch system 38, which is attached to transmission-side output hub 41 by drawn rivets. Transmission-side output hub 41 is non-rotatably connected by teeth to a second transmission input shaft 42, which is implemented as a hollow shaft. First transmission input shaft 31 is rotatably positioned within second transmission input shaft 42.

The two multi-clutch systems 27 and 38 are operated by means of operating levers 44, 45, whose radially inner ends are supported on actuating bearings that are axially actuated by actuating pistons (not shown). The operating levers 44, 45 are preferably connected in a single piece to corresponding diaphragm springs (not shown).

The multi-plate clutches 27, 38 are implemented as friction clutches with input-side and output-side friction units, which can be pressed together by means of axial compression parallel to an axis of rotation 50 of at least one of the transmission input shafts 31, 42 to provide frictional engagement therebetween. The friction units of the two friction clutches 27, 38 are situated radially one above the other and are formed from a plurality of layers of axially alternating input-side and output-side frictional partners.

To cool the friction units, a stream of cooling oil, which is produced, for example, with the help of a cooling oil pump (not shown), is fed to double clutch 6 through a cooling oil conduit 52. Cooling oil conduit 52 includes a central longitudinally drilled bore 53 in transmission input shaft 31, which is implemented as a solid shaft. Longitudinally drilled bore 53 is implemented as a blind bore, and at least one transversely-drilled bore extends from the end of longitudinally-drilled bore 53 and communicates with a pressure chamber 55. In accordance with an essential aspect of the present invention, and as shown in FIG. 1, pressure chamber 55 communicates with a radially-extending portion 43 that is situated at an output hub region 56 that is axially between the two output hubs 30 and 41.

An inner plate carrier region 57 of pressure chamber 55 is situated axially between the two inner plate carriers 28, 40. In addition, sealing elements 61, 62, in the form of thin plates, are incorporated into the respective riveted connections of the inner plate carriers 28, 40. Sealing elements 61, 62 serve to prevent leakage of the cooling oil through the teeth of inner plate carriers 28, 40, which open to the right and left. Sealing element 62 rotates at the same speed as inner plate carrier 40 and the corresponding transmission-side output hub 41. Sealing element 61 is connected to input-side inner plate carrier 28 and to the corresponding input-side output hub 30, which rotates at a relative speed compared with that of transmission-side output hub 41 and to outer plate carrier 36, which rotates at the input rotational speed of clutch input part 24.

In the installed condition, a misalignment can occur between the input-side output hub 30 or the associated inner plate carrier 28 and the outer plate carrier 36 with hanging end plates. Sealing element 61 is therefore preferably arranged between inner plate carrier 28 and the end plate that hangs from outer plate carrier 36, and in such a way that, depending upon the misalignment, the radial gap represents the narrow point between inner plate carrier 40 and sealing element 61, or between the end plate and sealing element 61. In both cases, leakage from pressure chamber 55 is prevented and a stream of oil is forced through the associated plate carriers and the friction plates. A collar 63 that surrounds inner plate carrier 40 is bent from sealing element 61. An analogous collar 64 of sealing element 62 is bent in the opposite direction.

At low output rotational speeds an over-pressure is sometimes needed to transport the cooling oil through the plate carriers and plates. That over-pressure in pressure chamber 55 presses input-side output hub 30 to the left against a retaining ring 66, and transmission-side output hub 41 to the right against another retaining ring 65. In this case, after the left retaining ring 66 has been installed through an assembly opening 67, which is provided at clutch input part 24, a stopper 68 must also be placed in order to seal the wet space off from the dry space. Stopper 68 is preferably provided with a rubber coating on its sealing surface.

Figure 2:
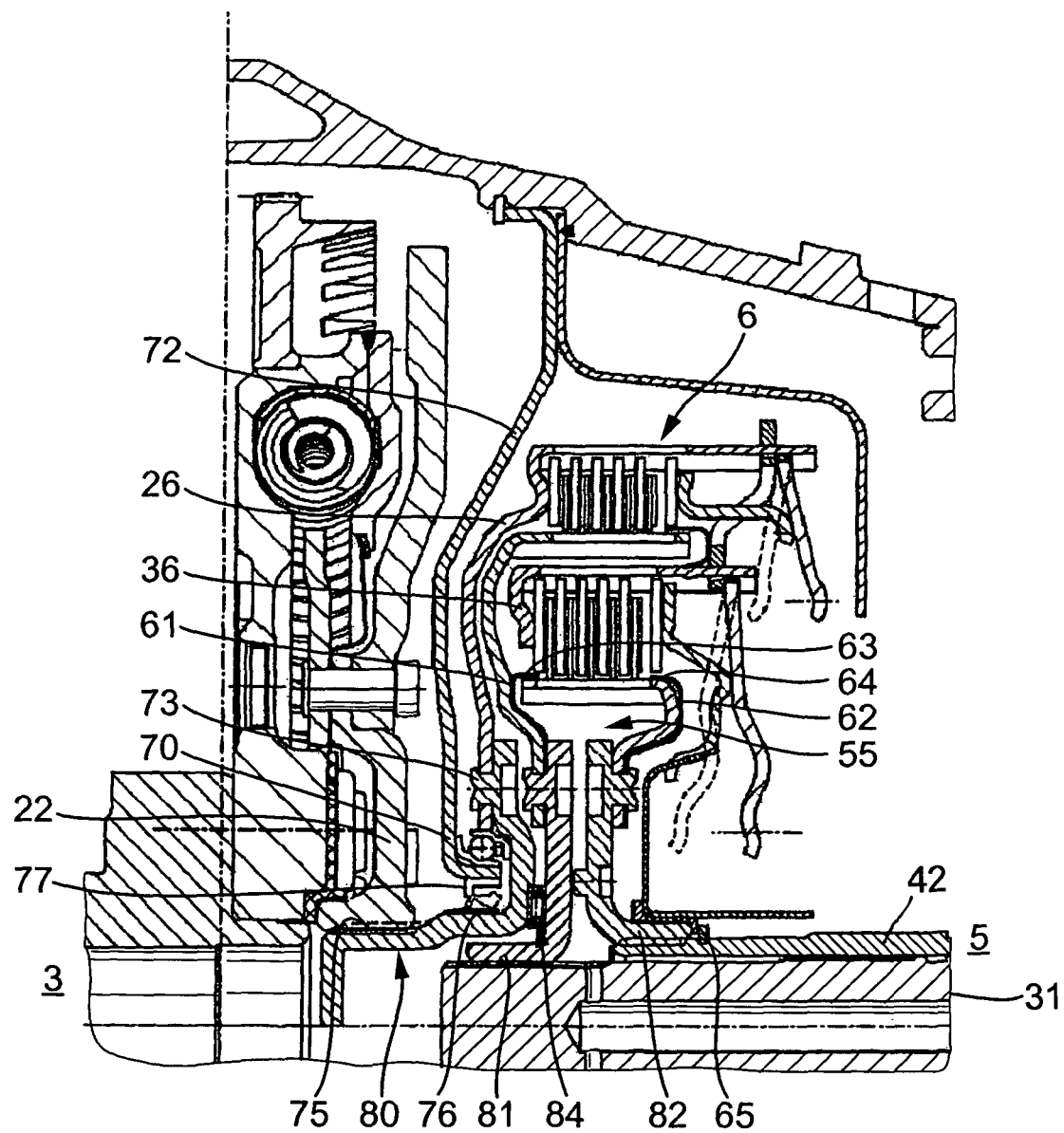
FIG. 2 shows a half-sectional view similar to that of FIG. 1 of another exemplary embodiment of the present invention.

FIG. 2 shows an exemplary embodiment that is similar to that in FIG. 1. The same reference numerals are used to designate like parts. For reasons of clarity, not all reference numerals are provided in FIG. 2. In the exemplary embodiment shown in FIG. 2, just as in the exemplary embodiment shown in FIG. 1, a bearing 70 is supported on a clutch cover 72. Bearing 70 serves to support on clutch cover 72 the clutch input part 24 in FIG. 1, or a clutch input part 80 in FIG. 2. In order to center bearing 70, an offset on clutch input part 24 or 80 is provided, which is produced by pressing out the drawn rivets 73 on clutch input parts 24 and 80.

Clutch input part 80 of FIG. 2 is further provided with outer teeth 75, which serve to provide a non-rotatable connection to connecting part 22. Clutch input part 24 of FIG. 1 is provided with corresponding teeth. Furthermore, a ring 76 made of a hardened material is attached to clutch input parts 24, 80. Hardened ring 76 forms a track for a radial sealing ring 77.

In contrast to the embodiment shown in FIG. 1, in FIG. 2 an output hub 81 is axially supported relative to clutch input part 80 by an axial bearing 84. A transmission-side output hub 82 is implemented in the same form as the corresponding component in the exemplary embodiment shown in FIG. 1. Through the biasing of the lever springs, outer plate carrier 26, which is attached to clutch input part 80 by drawn rivets, is supported on clutch cover 72 through bearing 70.

FIGS. 1 and 2 illustrate how cooling oil can be supplied through transmission shaft 31, which is implemented as a substantially solid shaft. Alternatively, however, the cooling oil can also be supplied between hollow shaft 42 and solid shaft 31. Furthermore, the cooling oil can also be supplied through the open teeth of transmission-side output hub 41 and 82. Furthermore, a pump drive (not shown) can be supported on transmission-side output hub 41.

Figure 3:
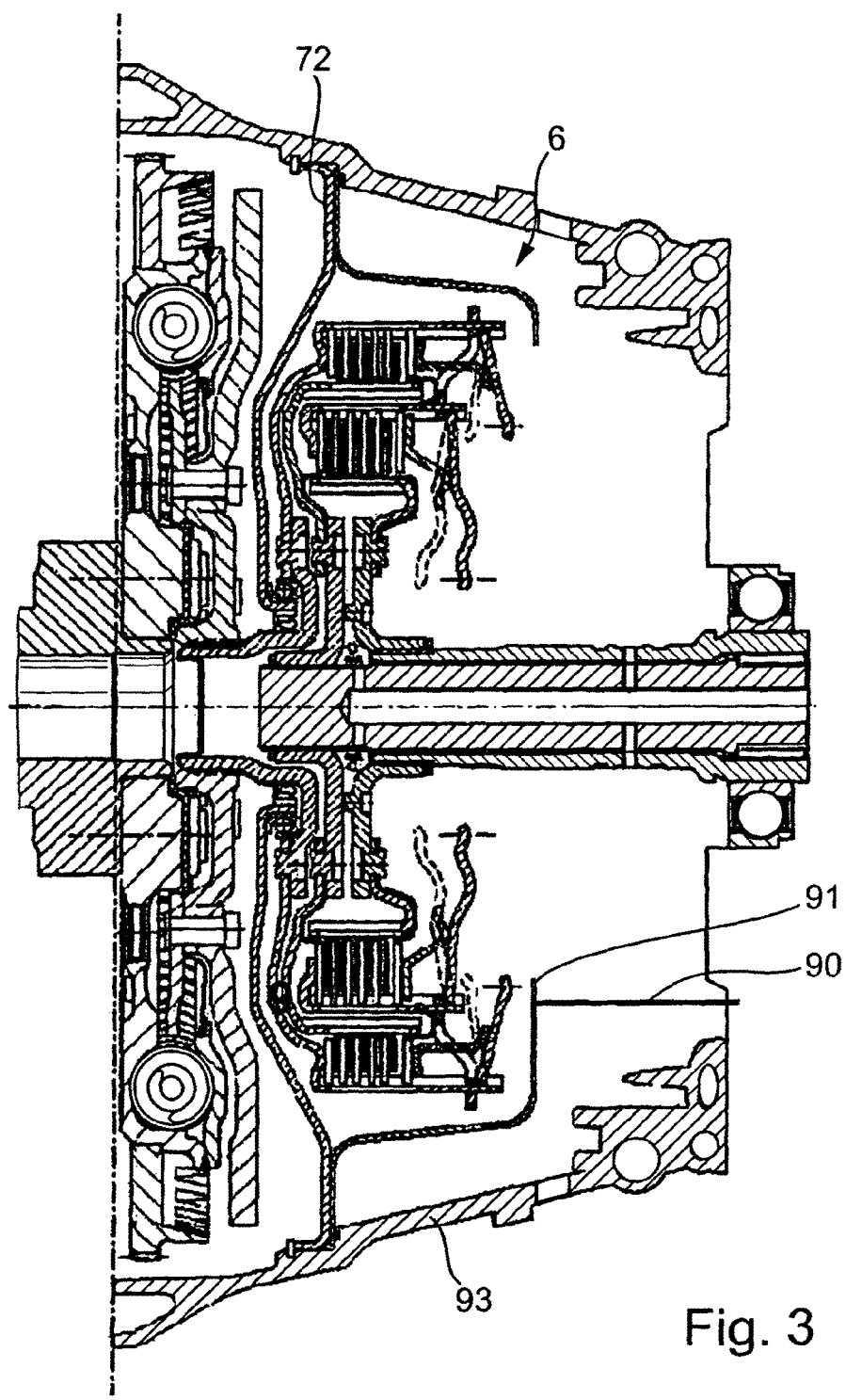
FIG. 3 shows a half-sectional view similar to that of FIG. 1 of a further exemplary embodiment of the present invention having a bulkhead element.
Figure 4:
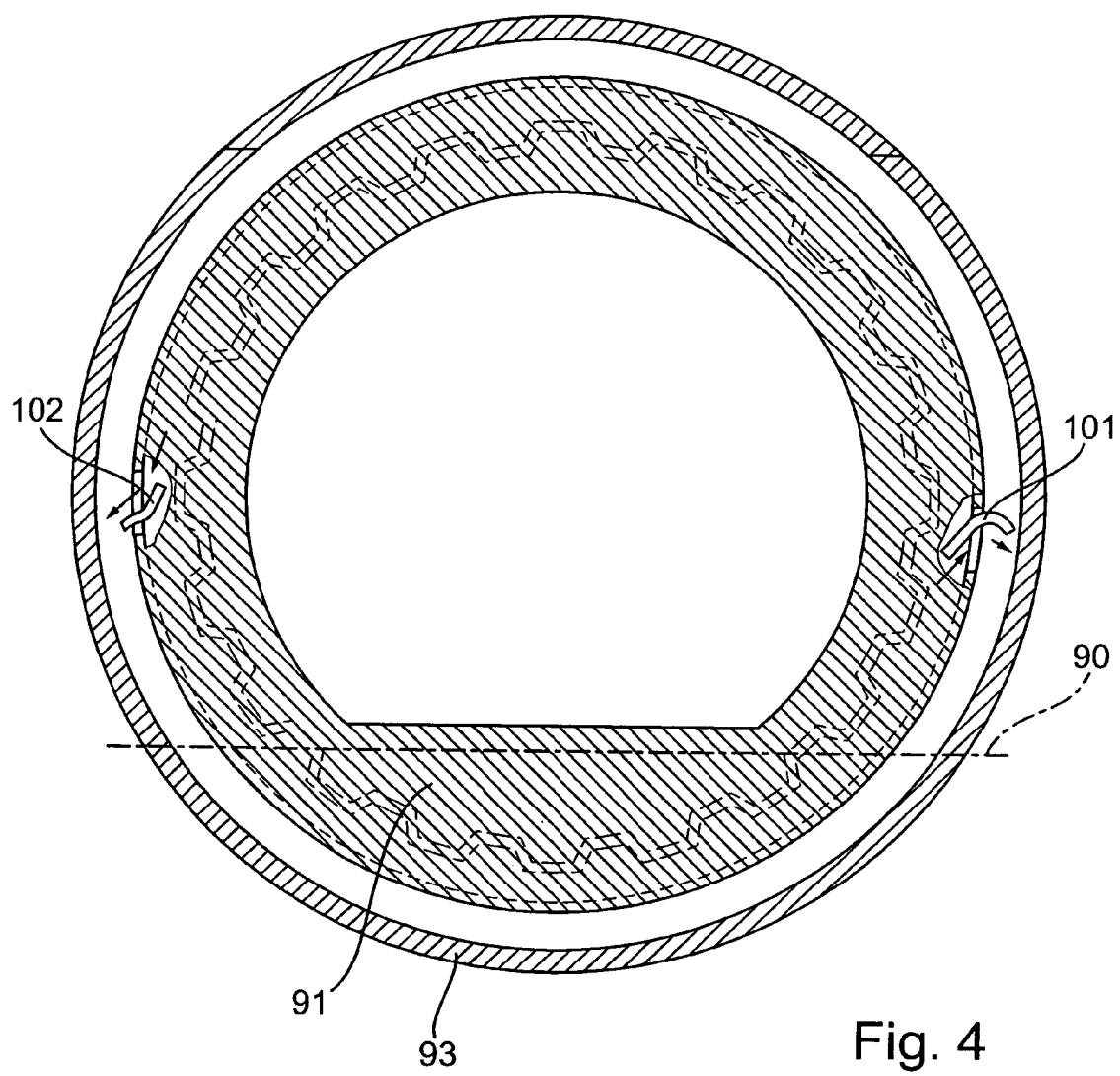
FIG. 4 is a cross-sectional view through the bulkhead element of the embodiment shown in FIG. 3.

FIGS. 3 and 4 show the same double clutch system as that in FIG. 1, or one that is very similar, in a longitudinal cross section. An oil sump is represented in both figures by a line 90. Oil sump 90 is a unified oil sump in a clutch bell housing 93 and in a transmission case (not shown) of the double clutch transmission. Oil sump 90 is higher in reference to the gravitational force operating line than the outside diameter of the double clutch, so that the clutch partially rotates within it. That could produce an unacceptably high drag torque on the clutch. In order to prevent that, a bulkhead element 91 which is implemented as a sheet metal or a plastic part, is used to provide a separate space around the clutch, that is at least below the region of oil sump 90. The clutch itself can keep this space free of oil by its rotational motion, and can also carry the cooling oil away again.

FIG. 4 illustrates that the removal of oil or cooling oil from the space isolated by bulkhead element 91 can be assisted by extraction elements 101, 102 above oil sump 90. That makes it possible to effectively prevent the oil from flowing in behind from the sump side, and thus prevents the clutch from sloshing full. Bulkhead element 91 is preferably axially fixed and mounted together with clutch cover 72 on clutch bell housing 93, and is secured against rotation by a projection that engages clutch bell housing 93.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A double clutch system for a drive train that includes a drive unit and a double clutch transmission, said double clutch system comprising: a first, solid inner transmission input shaft and a second, hollow transmission input shaft, wherein the first transmission input shaft is rotatably and coaxially positioned within the second transmission input shaft; two wet-running multi-plate clutches that each include respective axially spaced inner plate carrier components to define therebetween a radially-extending portion, each of which inner plate carrier components is non-rotatably connected to a respective one of the coaxially arranged input shafts, and between which axially spaced inner plate carrier components cooling oil is supplied into the radially-extending portion from a transverse bore that is formed in the first transmission input shaft and that communicates with a cooling oil conduit in the form of a blind bore that extends axially within the first transmission input shaft and from which cooling oil conduit and transverse bore cooling oil is supplied to the multi-plate clutches through the radially-extending portion, wherein a pressure chamber is provided between the axially spaced inner carrier components to communicate with the radially-extending portion for receiving the cooling oil from the transverse bore and from the cooling oil conduit, and wherein the pressure chamber is positioned radially inwardly of at least one of the multi-plate clutches, wherein the inner plate carrier components include respective inner plate carriers and one inner plate carrier includes a transmission-side output hub and another inner plate carrier includes an input-side output hub, which output hubs are each non-rotatably connected to a respective one of the transmission input shafts and axially bound the pressure chamber, and wherein a sealing element that partially encircles the input-side inner plate carrier is fastened to the input-side output hub.

2. A double clutch system in accordance with claim 1, including a bulkhead element that extends inwardly from a base portion of a clutch bell housing to a point above an upper surface of an oil sump that is situated within the clutch bell housing.

3. A double clutch system in accordance with claim 2, including cooling oil extraction elements provided above the oil sump.

4. A double clutch system in accordance with claim 2, wherein the bulkhead element is attached to the clutch bell housing together with a clutch cover.

5. A double clutch system in accordance with claim 4, wherein the bulkhead element is axially fixed in position between the clutch cover and an output-side extension of the clutch bell housing.

6. A double clutch system in accordance with claim 4, wherein the bulkhead element is secured against rotation relative to the clutch bell housing.

7. A double clutch system in accordance with claim 1, wherein the output hubs are axially spaced from each other.

8. A double clutch system in accordance with claim 7, wherein the transmission-side output hub is axially supported on the transmission side by a retaining ring carried by the second transmission input shaft.

9. A double clutch system in accordance with claim 7, wherein the input-side output hub is axially supported on the input side by a retaining ring carried by the first transmission input shaft.

10. A double clutch system in accordance with claim 7, wherein the input-side output hub is axially supported on a clutch input part.

11. A double clutch system in accordance with claim 10, including an axial bearing positioned between the input-side output hub and the clutch input part.

12. A double clutch system in accordance with claim 1, including a clutch input part positioned on an input side of the double clutch system and wherein a bearing is centered on an axial offset of the clutch input part.

13. A double clutch system in accordance with claim 12, wherein an input side outer plate carrier is rotatably supported on a clutch cover part by the bearing.

14. A double clutch system in accordance with claim 1, wherein the output hubs are sheet-metal hubs.

15. A double clutch system in accordance with claim 1, wherein the input-side output hub includes internal teeth.

16. A double clutch system in accordance with claim 1, wherein the inner plate carriers are each attached to respective ones of the output hubs by respective riveted connections.

17. A double clutch system for a drive train that includes a drive unit and a double clutch transmission, said double clutch system comprising: a first, solid inner transmission input shaft and a second, hollow transmission input shaft, wherein the first transmission input shaft is rotatably and coaxially positioned within the second transmission input shaft; two wet-running multi-plate clutches that each include respective axially spaced inner plate carrier components to define therebetween a radially-extending portion, each of which inner plate carrier components is non-rotatably connected to a respective one of the coaxially arranged input shafts, and between which axially spaced inner plate carrier components cooling oil is supplied into the radially-extending portion from a transverse bore that is formed in the first transmission input shaft and that communicates with a cooling oil conduit in the form of a blind bore that extends axially within the first transmission input shaft and from which cooling oil conduit and transverse bore cooling oil is supplied to the multi-plate clutches through the radially-extending portion, wherein a pressure chamber is provided between the axially spaced inner carrier components to communicate with the radially-extending portion for receiving the cooling oil from the transverse bore and from the cooling oil conduit, and wherein the pressure chamber is positioned radially inwardly of at least one of the multi-plate clutches, wherein the inner plate carrier components include respective inner plate carriers and one inner plate carrier includes a transmission-side output hub and another inner plate carrier includes an input-side output hub, which output hubs are each non-rotatably connected to a respective one of the transmission input shafts and axially bound the pressure chamber, including a sealing element that partially encircles the transmission-side inner plate carrier and is fastened to the transmission-side output hub.

18. A double clutch system in accordance with claim 17, wherein the output hubs are axially spaced from each other.

19. A double clutch system in accordance with claim 18, wherein the transmission-side output hub is axially supported on the transmission side by a retaining ring carried by the second transmission input shaft.

20. A double clutch system in accordance with claim 18, wherein the input-side output hub is axially supported on the input side by a retaining ring carried by the first transmission input shaft.

21. A double clutch system in accordance with claim 18, wherein the input-side output hub is axially supported on a clutch input part.

22. A double clutch system in accordance with claim 21, including an axial bearing positioned between the input-side output hub and the clutch input part.

23. A double clutch system in accordance with claim 17, including a clutch input part positioned on an input side of the double clutch system and wherein a bearing is centered on an axial offset of the clutch input part.

24. A double clutch system in accordance with claim 23, wherein an input side outer plate carrier is rotatably supported on a clutch cover part by the bearing.

25. A double clutch system in accordance with claim 17, wherein the output hubs are sheet-metal hubs.

26. A double clutch system in accordance with claim 17, wherein the input-side output hub includes internal teeth.

27. A double clutch system in accordance with claim 17, wherein the inner plate carriers are each attached to respective ones of the output hubs by respective riveted connections.

28. A double clutch system in accordance with claim 17, including a bulkhead element that extends inwardly from a base portion of a clutch bell housing to a point above an upper surface of an oil sump that is situated within the clutch bell housing.

29. A double clutch system in accordance with claim 28, including cooling oil extraction elements provided above the oil sump.

30. A double clutch system in accordance with claim 28, wherein the bulkhead element is attached to the clutch bell housing together with a clutch cover.

31. A double clutch system in accordance with claim 30, wherein the bulkhead element is axially fixed in position between the clutch cover and an output-side extension of the clutch bell housing.

32. A double clutch system in accordance with claim 30, wherein the bulkhead element is secured against rotation relative to the clutch bell housing.

33. A double clutch system for a drive train that includes a drive unit and a double clutch transmission, said double clutch system comprising: a first, solid inner transmission input shaft and a second, hollow transmission input shaft, wherein the first transmission input shaft is rotatably and coaxially positioned within the second transmission input shaft; two wet-running, multi-plate clutches that each include respective axially spaced inner plate carrier components to define therebetween a radially-extending open region bounded by the respective axially spaced inner plate carrier components and connected to a radially extending fluid passageway, wherein a respective one of the inner plate carrier components is non-rotatably connected to a respective one of the coaxially arranged transmission input shafts, and within the radially extending open region bounded by and between the axially spaced inner plate carrier components cooling oil is supplied from a cooling oil conduit that is provided between one of the transmission input shafts and a transmission-side inner plate carrier component and that communicates with the radially extending fluid passageway and with the radially extending open region, wherein cooling oil is supplied through the cooling oil conduit to the radially extending fluid passageway and to the radially extending open region to clutch disks of the multi-plate clutches, wherein a pressure chamber is provided between the axially spaced inner carrier components and communicates with the radially-extending open region for receiving cooling oil that flows from the cooling oil conduit and through the radially extending fluid passageway and to the radially extending open region, wherein the pressure chamber is positioned radially inwardly of at least one of the multi-plate clutches, and including a first sealing element that partially encircles the transmission side inner plate carrier and that is fastened to the transmission side output hub, and a second sealing element that partially encircles the input side inner plate carrier and is fastened to the input side output hub.

\* \* \* \* \*